US008915993B2

(12) United States Patent
Drappel et al.

(10) Patent No.: US 8,915,993 B2
(45) Date of Patent: Dec. 23, 2014

(54) SOLID OR PHASE CHANGE INKS WITH IMPROVED PROPERTIES

(75) Inventors: Stephan V. Drappel, Toronto (CA); Peter G. Odell, Mississauga (CA); Marcel P. Breton, Mississauga (CA); Caroline M. Turek, Mississauga (CA); Paul J. McConville, Webster, NY (US); Mojgan Rabbani, Pittsford, NY (US); Jennifer J. Rea, Rush, NY (US); James R. Larson, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/482,096

(22) Filed: Jun. 10, 2009

(65) Prior Publication Data
US 2010/0313788 A1  Dec. 16, 2010

(51) Int. Cl.
*C09D 11/12* (2006.01)
*C09D 11/34* (2014.01)

(52) U.S. Cl.
CPC ............... *C09D 11/34* (2013.01); *C09D 11/12* (2013.01)
USPC ....................................... 106/31.29

(58) Field of Classification Search
None
See application file for complete search history.

(56) References Cited

U.S. PATENT DOCUMENTS

| | | | |
|---|---|---|---|
| 3,653,932 A | 4/1972 | Berry et al. | |
| 4,390,369 A | 6/1983 | Merritt et al. | |
| 4,484,948 A | 11/1984 | Merritt et al. | |
| 4,658,064 A | 4/1987 | Moore et al. | |
| 4,684,956 A | 8/1987 | Ball | |
| 4,737,190 A | 4/1988 | Shimada et al. | |
| 4,830,671 A | 5/1989 | Frihart et al. | |
| 4,851,045 A | 7/1989 | Taniguchi | |
| 4,889,560 A * | 12/1989 | Jaeger et al. | 106/31.29 |
| 4,889,761 A | 12/1989 | Titterington et al. | |
| 5,006,170 A * | 4/1991 | Schwarz et al. | 106/31.3 |
| 5,013,857 A | 5/1991 | Berneth et al. | |
| 5,122,187 A | 6/1992 | Schwarz et al. | |
| 5,151,120 A | 9/1992 | You et al. | |
| 5,156,675 A | 10/1992 | Breton et al. | |
| 5,194,638 A | 3/1993 | Frihart et al. | |
| 5,221,335 A | 6/1993 | Williams et al. | |
| 5,279,655 A | 1/1994 | Takazawa et al. | |
| 5,372,852 A | 12/1994 | Titterington et al. | |
| 5,389,958 A | 2/1995 | Bui et al. | |
| 5,496,879 A | 3/1996 | Griebel et al. | |
| 5,597,856 A * | 1/1997 | Yu et al. | 524/227 |
| 5,621,022 A | 4/1997 | Jaeger et al. | |
| 5,750,604 A | 5/1998 | Banning et al. | |
| 5,780,528 A | 7/1998 | Titterington et al. | |
| 5,782,966 A | 7/1998 | Bui et al. | |
| 5,783,658 A | 7/1998 | Banning et al. | |
| 5,827,918 A | 10/1998 | Titterington et al. | |
| 5,830,942 A | 11/1998 | King et al. | |
| 5,919,839 A | 7/1999 | Titterington et al. | |
| 5,948,150 A | 9/1999 | Lin et al. | |
| 6,015,847 A | 1/2000 | Titterington et al. | |
| 6,132,500 A * | 10/2000 | Inaishi | 106/31.31 |
| 6,174,937 B1 | 1/2001 | Banning et al. | |
| 6,255,432 B1 | 7/2001 | Evans et al. | |
| 6,309,453 B1 | 10/2001 | Banning et al. | |
| 6,380,423 B2 | 4/2002 | Banning et al. | |
| 6,464,766 B1 | 10/2002 | Banning et al. | |
| 6,476,146 B2 | 11/2002 | Matzinger | |
| 6,525,161 B1 | 2/2003 | Hall | |
| 6,547,380 B2 | 4/2003 | Smith et al. | |
| 6,602,594 B2 | 8/2003 | Miyata et al. | |
| 6,620,228 B1 | 9/2003 | King et al. | |
| 6,652,635 B2 | 11/2003 | Rangaraj et al. | |
| 6,858,070 B1 | 2/2005 | Wong et al. | |
| 6,860,930 B2 | 3/2005 | Wu et al. | |
| 6,906,118 B2 | 6/2005 | Goodbrand et al. | |
| 7,034,185 B2 | 4/2006 | Banning et al. | |
| 7,270,408 B2 | 9/2007 | Odell et al. | |
| 7,501,015 B2 | 3/2009 | Odell et al. | |
| 7,578,587 B2 * | 8/2009 | Belelie et al. | 347/105 |
| 2003/0203987 A1 | 10/2003 | Nomoto et al. | |
| 2004/0261656 A1 | 12/2004 | Wu et al. | |
| 2004/0261657 A1 | 12/2004 | Wu et al. | |
| 2006/0035999 A1 | 2/2006 | Bedford et al. | |
| 2007/0095250 A1 | 5/2007 | Uhlir-Tsang et al. | |
| 2007/0120914 A1 * | 5/2007 | Wu et al. | 347/99 |
| 2007/0120922 A1 * | 5/2007 | Belelie et al. | 347/100 |
| 2007/0184267 A1 | 8/2007 | Mioskowski et al. | |
| 2008/0045638 A1 * | 2/2008 | Chapman et al. | 524/425 |
| 2008/0098927 A1 | 5/2008 | Allen et al. | |
| 2008/0098929 A1 * | 5/2008 | Turek et al. | 106/31.29 |

FOREIGN PATENT DOCUMENTS

| | | |
|---|---|---|
| CN | 101362869 A | 2/2009 |
| DE | 42 05 636 A1 | 8/1993 |
| DE | 42 05 713 A1 | 3/1996 |
| EP | 0 187 352 | 7/1986 |
| EP | 0 206 286 | 12/1986 |

(Continued)

OTHER PUBLICATIONS

UN Food and Agriculture Organization, Carnauba wax data sheet.*
Malitschek; "Waxes by Clariant;" *Clariant* (Edition May 2003/W 320 GB).
U.S. Appl. No. 12/131,356, filed Jun. 2, 2008, in the name of Wong et al.
Extended European Search Report dated Sep. 24, 2010 for EP 10 16 4539.8.
Office Action in Canadian Patent Application No. 2,705,983, mailed Feb. 20, 2012.
Office Action dated Aug. 1, 2013 issued in U.S. Appl. No. 13/475,737.
Office Action dated Feb. 25, 2013 issued in U.S. Appl. No. 13/475,762.
Office Action dated Feb. 3, 2009 issued in U.S. Appl. No. 11/702,818.
Office Action dated Aug. 26, 2009 issued in U.S. Appl. No. 11/702,818.

(Continued)

*Primary Examiner* — Yun Qian

(57) ABSTRACT

A solid or phase change inkjet ink incorporating a polar acidic wax is described. The use of polar waxes as an ink additive improves the polarity of the ink and adhesion of the ink to paper. A method for applying the solid or phase change ink incorporating an acidic polar wax additive to form an image is also described.

6 Claims, No Drawings

(56) References Cited

FOREIGN PATENT DOCUMENTS

| | | |
|---|---|---|
| EP | 1 085 063 A2 | 3/2001 |
| EP | 1 275 702 A1 | 1/2003 |
| EP | 1 471 116 | 10/2004 |
| EP | 1 491 595 | 12/2004 |
| EP | 1 491 596 | 12/2004 |
| EP | 1 493 781 | 1/2005 |
| EP | 1 535 973 | 6/2005 |
| GB | 2 238 792 | 6/1991 |
| GB | 2 290 793 A | 1/1996 |
| GB | 2 294 939 A | 5/1996 |
| GB | 2 305 670 A | 4/1997 |
| GB | 2 305 978 A | 4/1997 |
| JP | 56-057848 | 5/1981 |
| JP | 04-370167 | 12/1992 |
| JP | A-H09-003377 | 1/1997 |
| JP | H09-071743 A | 3/1997 |
| JP | A-H10-316912 | 12/1998 |
| JP | 2008-106273 A | 5/2008 |
| WO | WO 94/04619 | 3/1994 |
| WO | WO 94/14902 | 7/1994 |
| WO | WO 95/04760 | 2/1995 |
| WO | WO 96/14364 | 5/1996 |
| WO | WO 97/12003 | 4/1997 |
| WO | WO 97/13816 | 4/1997 |
| WO | WO 97/33943 | 9/1997 |
| WO | WO 2009/013169 | 1/2009 |

OTHER PUBLICATIONS

Office Action dated Aug. 22, 2011 issued in U.S. Appl. No. 11/702,818.
Office Action dated Mar. 20, 2012 issued in U.S. Appl. No. 11/702,818.
Office Action dated Jun. 20, 2013 issued in U.S. Appl. No. 11/702,818.
Patent Office Communication dated Jun. 21, 2013 issued in European Patent Application No. 12 004 388.0-1451.
Office Action dated Jul. 25, 2013 issued in Korean Patent Application No. 2010-0054380 (with translation).
U.S. Appl. No. 11/702,818, filed Feb. 6, 2007 in the name of Banning.
European Search Report dated May 8, 2008 issued in European Patent Application No. 08 150 829.3.
Clariant Huningue, "Savinyl dyes: Exactly Your Colorants for Inkjet," Jan. 2001, pp. 1-11.
Office Action dated Jul. 30, 2013 issued in Chinese Patent Application No. 201010199256.1 (with translation).
Office Action dated Apr. 5, 2013 issued in U.S. Appl. No. 13/475,737.
Office Action issued Feb. 19, 2013 in European Patent Application No. 10164539.8.
Office Action issued Mar. 22, 2013 in Korean Patent Application No. 2010-0054380 (w/translation).
Wikipedia® Entry for Carnauba Wax, accessed May 28, 2013.
Office Action mailed Feb. 20, 2014 in U.S. Appl. No. 13/475,737.
Office Action mailed Mar. 13, 2014 in U.S. Appl. No. 13/475,762.

* cited by examiner

SOLID OR PHASE CHANGE INKS WITH IMPROVED PROPERTIES

TECHNICAL FIELD

The present disclosure is generally directed to inks, for example, solid or phase change inks. Moreover, the present disclosure is directed to the preparation of solid or phase change inks, especially solid and phase change inkjet inks, and their use in methods for forming images, particularly their use in ink jet printing.

BACKGROUND

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In inkjet printing processes and other inkjet recording processes, it is necessary that the ink being used meet various stringent performance characteristics. These performance characteristics are generally more stringent than those for liquid ink applications, such as for writing instruments (a fountain pen, felt pen, and the like).

Further, there are many requirements for the compositions including the above-described inks for inkjet recording, and specific examples thereof include. (1) no clogging of nozzles of inkjet recording heads; (2) superior ejection stability and frequency responsiveness; (3) good recovery of smooth ink ejection after residing in printhead for a long time, such as greater than two weeks; (4) no partitioning even after long-term storage; (5) no corrosion-deterioration of members, such as the recording heads, which contact therewith; (6) provision of favorable printing quality; (7) safety and no unpleasant odor; and the like.

Various inks for inkjet printing processes are known in the art. For example, various inkjet inks are disclosed in U.S. Pat. Nos. 4,737,190 and 5,156,675.

Although numerous inkjet inks are presently available, they generally do not meet all of the above-described requirements, while also providing excellent print quality on plain paper. In particular, the inks generally used in inkjet printing processes, while producing acceptable print quality, do not produce the high print quality that is achieved by using dry toner compositions, such as in electrostatographic imaging processes.

A need continues to exist in the inkjet industry for improved inkjet inks, and processes for producing the same, that satisfy the above-described requirements while providing high quality prints on a wide variety of recording media, including plain paper. Although some currently available inkjet inks may provide waterfast images with better substrate latitude, the inks are unacceptable in that they generally smear, have poor latency and maintainability characteristics, and are not easily marked on after the image is produced. Thus, there remains a need in the inkjet ink industry for improved black and colored inks that satisfy the above requirements, and allow for the printed image to be marked on after it is produced, without beading or smearing of the subsequently applied marking.

One type of inkjet ink that is commercially available is a solid inkjet ink that contains non-polar molecules as its major components. One of the major problems with current solid inkjet inks is the non-polar nature of the major ink components, which hinders the ink adhesion to the paper fibers and does not readily allow for the printed image to be marked on after it is produced. As a result, scratch resistance and fold properties as well as marking characteristics after the image is produced with current solid ink jet inks are in need of improvement.

The current solid inkjet ink preparation process uses about 5 polymeric components and requires a jetting viscosity of almost 11.2 cps that is reached at a temperature of 135° C. and a standby temperature of 110° C. Unfortunately, the current solid or phase change inkjet ink printing process can consume a lot of energy to produce an image with inadequate fold and scratch resistance properties, and undesirable marking characteristics after the image is produced.

SUMMARY

In order to solve the above-identified problems, this disclosure describes the incorporation of a polar acidic wax into a solid or phase change ink. The use of polar waxes as an ink additive improves the polarity of the ink and ink adhesion to paper and also the marking characteristics of the print after the image is produced. These waxes have lower melting transitions that result in slower ink crystallization rates. At the same time, the increased acidity improves the ink adhesion to the mainly alkaline papers. When added to a solid or phase change inkjet ink, the acidic polar wax additives of this disclosure are very miscible with the other ink components. In addition, dramatic improvements in the scratch resistance and fold properties are observed when the ink of the present disclosure is printed directly to paper or when used in offset printing applications. In addition, the incorporation of the acidic polar wax additives of this disclosure into solid or phase change inkjet inks significantly improves the amenability of the printed image to subsequent marking.

The present disclosure also relates to a method for applying the solid or phase change ink incorporating an acidic polar wax additive to form an image. In embodiments, the method comprises providing the ink at or above a first temperature; applying the ink to a substrate to form an image, the substrate being at or below a second temperature.

DETAILED DESCRIPTION OF EMBODIMENTS

The solid or phase change ink compositions typically have melting points no lower than about 20° C. such as about 50° C. to about 160° C. or more. In embodiments, the ink compositions have a melting point of about 60° C. to about 140° C., such as about 70° C. to about 100° C.

The solid or phase change inks described herein are generally jetted at temperatures of about 60° C. to about 100° C., such as about 60° C. to about 90° C. The jetting temperature must be within the range of thermal stability of the composition At jetting, the solid or phase change inks generally have a viscosity of from about 4 mPa-s to about 50 mPa-s, such as from about 4 mPa-s to about 22 mPa-s, and or 9 mPa-s to about 12 mPa-s.

The solid or phase change inks described herein can be employed in apparatus for direct printing ink jet processes, wherein when droplets of the melted ink are ejected in an imagewise pattern onto a recording substrate, the recording substrate is a final recording substrate. In this embodiment, the solid or phase change ink is heated to a temperature at or above the first temperature and printed directly onto an image receiving substrate. The image receiving substrate is generally kept at or below the second temperature. For example, the substrate may be maintained at a temperature of about 20° C. to about 80° C. such as from about 30° C. to about 60° C. The substrate temperature must be at least 10° C., but no more than 50° C., below the first temperature. Where the ink is radiation curable, the ink is exposed to radiation energy on the substrate to initiate polymerization of the polymerizable components of the ink.

The solid or phase change inks described herein can also be employed in indirect (offset) printing ink jet applications, wherein when droplets of the melted ink are ejected in an imagewise pattern onto a recording substrate, the recording substrate is an intermediate transfer member and the solid or phase change ink in the imagewise pattern is subsequently transferred from the intermediate transfer member to a final recording substrate.

The solid or phase change inks described herein are suited for jetting onto an intermediate transfer substrate, e.g., an intermediate transfuse drum or belt. In a suitable design, the image may be applied by jetting appropriately colored solid or phase change inks during four to eighteen rotations (in an arbitrarily designated y-axis direction) of the intermediate transfer member with the ink jetting head undergoing a small translation in the x direction with respect to the transfer member in between each rotation. This approach simplifies the printhead design, and the small movements ensure good droplet registration. Transfuse, i.e., a transfer and fusing step, is desirable in forming the image as transfuse enables a high quality image to be built up on a rapidly rotating transfer member. This approach simplifies the printhead design, while the small movements of the head ensure good droplet registration. Transfuse typically involves jetting the solid or phase change ink from the ink jet head onto an intermediate member such as a belt or drum, i.e., the transfuse member. This procedure allows the image to be rapidly built onto the transfuse member for subsequent transfer and fusing to an image receiving substrate.

The intermediate transfer member may take any suitable form, although it is generally a drum or belt. The member surface may be at room temperature, although in embodiments it is preferable to heat the member such that a surface temperature thereof is maintained within a narrow temperature range so as to control the viscosity characteristics of the inks over a wide range of environmental conditions. This temperature is generally at or below the second temperature. In this way, the solid or phase change inks is maintained on the surface of the transfer member until transfer to the image receiving substrate.

Once upon the intermediate transfer member surface, the jetted solid or phase change ink may be exposed to radiation to a limited extent so as to effect a limited curing of the ink upon the intermediate member surface. This intermediate curing is not to cure the ink to its full extent, but merely to assist in setting the ink up so that it may be transferred to the image receiving substrate with the appropriate amount of penetration, which requires the ink droplets to have a certain rheology before transfer. For controlling the extent of the curing if an intermediate cure is practiced, reference is made to U.S. Pat. No. 7,270,408, incorporated herein by reference. This intermediate curing step may not be needed since the phase change is generally sufficient to impart the desired rheology to the ink droplets.

Following jetting to the intermediate transfer member and optional intermediate curing thereon, the solid or phase change ink is thereafter transferred to an image receiving substrate. The substrate may be any suitable material such as paper, boxboard, cardboard, fabric, a transparency, plastic, glass, metal, wood etc., although the solid or phase change inks described herein are most generally used in forming images on paper. Following transfer to the substrate, the image on the substrate may be exposed to radiation having an appropriate wavelength, mainly the wavelength at which the ink initiator, if present, absorbs radiation, to initiate the curing reaction of the ink. The radiation exposure need not be long, and may be for, e.g., about 0.05 to about 10 seconds, such as from about 0.2 to about 2 seconds. These exposure times are more often expressed as substrate speeds of the ink passing under a UV lamp. For example, the microwave energized, doped mercury bulbs available from UV Fusion (Gaithersburg, Md.) are placed in an elliptical mirror assembly that is 10 cm wide; multiple units may be placed in series. Thus, a belt speed of 0.1 ms$^{-1}$ would require 1 second for a point of an image to pass under a single unit, while a belt speed 4.0 ms$^{-1}$ would require 0.2 s to pass under four bulb assemblies. The radiation to cure the polymerizable components of the ink is generally provided by a variety of possible techniques, including but not limited to heat, a xenon lamp, laser light, D or H bulb, LED, a UV light source, etc. The curing light may be filtered, if desired or necessary. The curable components of the ink react to form a cured or crosslinked network of appropriate hardness. Generally, the curing is substantially complete, i.e., at least 75% of the curable components are cured (polymerized and/or crosslinked), to allow the ink to be substantially hardened, and thereby to be much more scratch resistant, and also to adequately control the amount of showthrough on the substrate.

When an indirect printing process is used, the intermediate transfer member can be of any desired or suitable configuration, such as a drum or roller, a belt or web, a flat surface or platen, or the like. The intermediate transfer member can be heated by any desired or suitable method, such as by situating heaters in or near the intermediate transfer member, or the like. The intermediate transfer member may also be cooled by situating fans nearby or heat exchange with a cooled fluid. Optionally, a layer of a sacrificial liquid can be applied to the intermediate transfer member prior to ejecting the droplets of melted ink onto the intermediate transfer member, whereby the melted ink droplets are ejected onto the sacrificial liquid layer on the intermediate transfer member, as disclosed in, for example, U.S. Pat. No. 5,389,958. Transfer from the intermediate transfer member to the final recording substrate can be by any desired or suitable method, such as by passing the final recording substrate through a nip formed by the intermediate transfer member and a back member, which can be of any desired or effective configuration, such as a drum or roller, a belt or web, a flat surface or platen, or the like.

As used herein, the term "viscosity" refers to a complex viscosity, which is the typical measurement provided by a mechanical spectrometer that is capable of subjecting a sample to a steady shear strain or a small amplitude sinusoidal deformation. In this type of instruments, the shear strain is applied by the operator to the motor and the sample deformation (torque) is measured by the transducer. Examples of such instruments are the Rheometrics Fluid Spectrometer RFS3 or the ARES mechanical spectrometer, both made by Rheometrics, a division of TA Instruments. Alternatively a controlled stress instrument, where the shear stress is applied and the resultant strain is measured, may be used. Examples of such instruments are the majority of the current rheometers, the main manufacturers being Anton Parr GmbH, Bohlin Instruments, a division of Malvern Instruments, ATS Rheosystems and TA Instruments. Such a rheometer provides a periodic measurement of viscosity at various plate rotation frequencies, $\omega$, rather than the transient measurement of, for instance, a capillary viscometer. The reciprocating plate rheometer is able to measure both the in phase and out of phase fluid response to stress or displacement. The complex viscosity, $\eta^*$, is defined as $\eta^* = \eta' - i\eta''$; where $\eta' = G''/\omega$, $\eta'' = G'/\omega$ and i is $\sqrt{-1}$. Alternatively a viscometer that can measure only the transient measurement of, for instance, a capillary or shear viscosity such as the ones made by Brookfield Engineering Laboratories or Cannon Instrument Company can also be used.

The composition of the present disclosure is a solid or phase change inkjet ink that may contain any combination of ingredients, as long as it meets physical properties and characteristics encompassed by this disclosure. Because the composition is a solid or phase change ink, it includes at least one component, or a combination of two, three, four, five, six, or more major components, that provides for the phase change. An agent that provides for this phase change is referred to hereinafter as a "phase change agent."

This phase change agent can be any component that is miscible with the other components of the composition and promotes the increase in viscosity of the ink as it cools from the jetting temperature, such as between 60 and 110° C., to the substrate temperature, which is generally between 20° C. and 50° C. Examples of classes of phase change agents include solid alcohols, waxes and gellants.

In embodiments, a wax acts as a phase change agent, which can be either a single type of wax or a mixture of two or more different waxes. As used herein, the term wax includes natural, modified natural, and synthetic waxes. A single wax can be added to formulations, for example, to improve particular properties, such as hardness, gloss, offset properties, and the like. Alternatively, a combination of waxes can be added to provide multiple properties to the composition.

The solid or phase change ink of the present disclosure includes at least one polar wax, which improves the polarity of the ink and ink adhesion to paper. In embodiments, the polar wax may be acidic. Not intending to be bound by theory, it is believed that the increase in acidity and/or polarity improves the ink adhesion to the mainly alkaline papers. Examples of the polar acidic wax include Licowax® SW and similar polar acidic waxes (available from Clariant and described in "Waxes by Clariant," by Otto Malitschek and revised by Wilhelm Herfert (Edition May 2003/W 320 GB, herein incorporated by reference in its entirety) and other derivatives of montan acid within the series of montan acid, such as those that contain a long aliphatic chain. As used herein the term "long aliphatic chain" is a chain with 14 or more carbon atoms.

In embodiments the viscosities of the polar acidic waxes are from about 10 to 50 mPa-s at 120° C. and thermal properties, such as a melting point of from about 60° C. to about 100° C. or from about 70° C. to about 90° C., for example about 80° C. (as measured by differential scanning calorimetry). Other desired properties are Flow Hardness as described in "Waxes by Clariant," by Otto Malitschek and revised by Wilhelm Herfert (Edition May 2003/W 320 GB), as the pressure in bar that is necessary to press a flat, circular metal stamp measuring 1 cm in diameter through the wax sample at 23° C. and using a Clariant GmbH internal testing and inspection procedure. In embodiments, the Flow Hardness values for wax samples may be from about 300 bar to about 1000 bar, for example, from 500 bar to about 1000 bar.

In embodiments, the acid number of the individual polar acidic waxes included in the ink composition may differ for each individual polar acidic wax. As used herein the term acid number is the number of milligrams of KOH required in order to neutralize the free acid contained in one gram of wax. The acid number may be used to determine the amount of polarity of the waxes due to the dipolar character. The number and strength of the polar groups as well as the length of the non-polar part of the molecule influence the acid number. In alternative embodiments, the ink compositions may contain an individual polar acidic wax having a single acid number. In embodiments, the acid number of the wax(es) may be in the range of from about 0 to about 160 mgKOH/g, such as about 100 to about 160 mgKOH/g, or from about 127 to about 160 mgKOH/g.

Suitable examples of polar acidic waxes are linear, saturated, aliphatic waxes, such as aliphatic waxes having an end-functionalized carboxylic acid. Other suitable examples of polar acidic waxes include waxes having a high acid content of, for example, greater than about 30% acid functionalized, such as greater than about 50% acid functionalized or greater than about 70% acid functionalized. Other examples of polar acid waxes are those with acid number of greater than about 15 mgKOH/g, such as greater than about 85 mgKOH/g, or greater than about 115 mgKOH/g. In alternative embodiments, the acid number of the polar waxes may have maximum of about 5 mgKOH/g.

In embodiments, the polar acidic wax is a montan wax derivative, having an aliphatic chain length distribution of $C_{22}$-$C_{34}$ with a maximum in the $C_{26}$-$C_{28}$ range, such as, for example, n-octacosanoic acid, $CH_3(CH_2)_{26}COOH$, about 100% acid functionalized. Examples of such suitable montan waxes include, but are not limited to, Licowax® S, manufactured by Clariant GmbH (Germany), Licowax® SW, Licowax® UL and Licowax® X101. Other suitable polar acidic waxes include partly esterified montanic acid waxes, where some of the acid termination have been esterified, such as Licowax® U. The derivatives of montanic acids are generally prepared by oxidative bleaching of crude montan wax, reaction of the resultant acid wax with an alcohol or amide and/or hydrolysis with an alkali metal hydroxide or alkaline earth metal hydroxide.

In embodiments, specific examples of polar waxes may include beeswax acid, $C_{10}$-$C_{40}$ hydroxyalkyl acid, $C_{10}$-$C_{40}$ isoalkylacid, coconut acid, corn acid, hydrogenated tallow acid, hydrogenated coconut acid, hydrogenated palm acid, hydroxystearic acid, isostearic acid, linseed acid, rice bran acid, palm acid, palm kernel acid, tall oil acid, tallow acid, undecanioic acid, undecylenic acid, myristic acid, palmitic acid, oleic acid, stearic acid, behenic acid, linoleic acid, $C_{18}$-$C_{36}$ acid, $C_{20}$-$C_{40}$ acid, $C_{29}$-$C_{70}$ acid, $C_{30}$-$C_{50}$ acid, $C_{40}$-$C_{60}$ acid, and mixtures thereof, such as a combination of any of the following acids: palmitic acid, oleic acid, stearic acid, montanic acid, Licowax® S, Licowax® LP, Licowax® SW and mixtures thereof. Licowax is a registered trademark of Clariant, Germany.

In embodiments, the saponification value of the polar acidic waxes may be greater than about 0 mgKOH/g, such as greater than about 97 mgKOH/g, or greater than about 140 mgKOH/g. In alternative embodiments, the saponification value of the polar waxes may have a maximum of about 15 mgKOH/g. As used herein the term "saponification value" is the number of milligrams of KOH required in order to neutralize the free acids and acids released from esters in one gram of wax. The saponification value is a measure of the amount of free acids and divisible esters present. The esters are broken up with alcoholic KOH; the unconsumed KOH is titrated with acid. The difference between the saponification value and the acid value is the ester value. The ester value, like the acid value, may be used to determine the amount of polarity of the waxes.

In embodiments, polar waxes, have an acid number, such as greater than 0 mgKOH/g, or greater than about 15 mgKOH/g, such as about 25 mgKOH/g to about 95 mgKOH/g and saponification value greater than 0 mgKOH/g, such as greater than about 97 mgKOH/g or greater than about 120 mgKOH/g, for example, about 130 mgKOH/g to about 182 mgKOH/g or greater than about 140 mgKOH/g, for example, about 140 mgKOH/g to about 182 mgKOH/g. Some acid waxes are a derivative of montan wax derived by the saponification and oxidation with chromic acid solutions. Acids may also be esterified with mono- and polyvalent alcohols to obtain ester waxes. Saponification with metal hydroxides can lead to metal soaps. Partially saponified ester waxes can be then obtained by combining the esterification and saponification processes. Suitable examples of the above waxes include Licowax® E and Licowax® KPS as ester wax, Licowax® OP and Licowax® O as partial saponifiable ester wax, and the like, as seen in Table 1 below. Table 1 lists a few exemplary polar waxes, which are available from Clariant, and various properties of these waxes, suitable for use in the solid or phase change inks of the present disclosure.

TABLE 1

Exemplary polar waxes available from Clariant

| Licowax ® Product | Chemical Characterization | Drop Point (° C.) | Viscosity @ 100° C. (cps) | Acid Number (mgKOH/g) | Saponification Value (mgKOH/g) |
|---|---|---|---|---|---|
| U | Native Montan Wax | 80-86 | ~30 | 72-82 | 125-150 |
| S | Acid Wax | 79-85 | ~30 | 127-160 | 157-182 |
| LP | Acid Wax | 82-89 | ~30 | 113-130 | 140-170 |
| UL | Acid Wax | 81-87 | ~30 | 100-115 | 130-160 |
| SW | Acid Wax | 81-87 | ~30 | 115-135 | 145-175 |
| NC | Acid Wax | 81-87 | ~30 | 105-125 | 145-165 |
| E | Ester Wax | 79-83 | ~30 | 15-20 | 140-160 |
| F | Ester Wax | 75-81 | ~30 | | 97-113 |
| KP | Montan Wax | 81-87 | ~30 | 20-30 | 130-165 |
| KPS | Ester with multifunctional alcohols | 78-82 | ~30 | 25-35 | 135-150 |
| KSL | Ester with multifunctional alcohols | 79-85 | ~30 | 28-33 | 134-167 |
| KFO | Ester with multifunctional alcohols | 86-92 | ~30 | 85-95 | 120-145 |
| KST | Ester with multifunctional alcohols | | ~30 | max 5 | max 15 |
| BJ | Ester Wax Compound | 72-78 | ~30 | 17-25 | 135-165 |

The polar acidic wax may comprise at least about 5% by weight of the ink, such as from about 5% to about 90% by weight of the ink, for example from about 10% to about 40% or from about 20% to about 30% by weight of the ink.

Other suitable examples of waxes include waxes selected from natural vegetable waxes, natural animal waxes, mineral waxes, synthetic waxes and functionalized waxes. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes include, for example, Fischer-Tropsch wax, acrylate wax, fatty acid amide wax, silicone wax, polytetrafluoroethylene wax, polymethylene wax, polyethylene wax, and polypropylene wax, and mixtures thereof.

In addition, suitable phase change agents described in U.S. Pat. No. 7,501,015, which is incorporated herein by reference in its entirety, may also be used.

The ink composition also may include a vehicle material, or mixture of two or more vehicle materials, which may or may not be identical to the phase change agent(s). In the case of a solid or a phase change ink jet ink composition, the vehicle can include one or more organic compounds. The vehicle for such solid ink or phase change compositions is typically solid at room temperature (about 20° C. to about 25° C.), but becomes liquid at the printer operating temperature for ejecting onto the print surface.

The ink composition also may include resins, polymers, copolymers and the like. Examples include, for example, ethylene/propylene polymers or copolymers. The polymers or copolymers may have, for example, a melting point of from about 70° C. to about 150° C., such as from about 80° C. to about 130° C. or from about 90° C. to about 120° C. and a molecular weight range of from about 500 to about 4,000. Commercial examples of such copolymers include, for example, Petrolite CP-7 (Mn=650), Petrolite CP-11 (Mn=1,100, Petrolite CP-12 (Mn=1,200) and the like.

Other suitable vehicle materials include urethane, urea, amide and imide derivatives of oxidized synthetic or petroleum waxes. In embodiments, the urethane, urea, amide and imide derivatives may be linear, branched, cyclic or any combination thereof. These materials may have a melting point of from about 60° C. to about 120° C., such as from about 70° C. to about 100° C. or from about 70° C. to about 90° C. Commercial examples of such materials include, for example, bis-urethanes such as PETROLITE CA-11®, PETROLITE WB-5® and PETROLITE WB-17®, all available from Baker Petrolite, and the like. Suitable examples also include urethane, urea, amide and imide derivatives disclosed in U.S. Pat. Nos. 6,620,228, 6,380,423, 6,464,766 and 6,309,453, each of which is incorporated herein by reference.

Other suitable vehicle materials that can be used in solid or phase change ink compositions include, for example, isocyanate-derived resins and waxes, such as urethane isocyanate-derived materials, urea isocyanate-derived materials, urethane/urea isocyanate-derived materials, mixtures thereof, and the like. Further information on isocyanate-derived vehicle materials is disclosed in, for example, U.S. Pat. Nos. 5,750,604, 5,780,528, 5,782,966, 5,783,658, 5,827,918, 5,830,942, 5,919,839, 6,255,432, and 6,309,453, British Patents Nos. GB 2 294 939, GB 2 305 928, GB 2 305 670, and GB 2 290 793, and PCT Publications WO 94/14902, WO 97/12003, WO 97/13816, WO 96/14364, WO 97/33943, and WO 95/04760, the entire disclosures of each of which are incorporated herein by reference.

Another type of ink vehicle may be n-paraffinic, branched paraffinic, and/or aromatic hydrocarbons, typically with from about 5 to about 100, such as from about 20 to about 180 or from about 30 to about 60 carbon atoms, generally prepared by the refinement of naturally occurring hydrocarbons, such as BE SQUARE 185 and BE SQUARE 195, with molecular weights (Mn) of from about 100 to about 5,000, such as from about 250 to about 1,000 or from about 500 to about 800, for example such as available from Petrolite.

Highly branched hydrocarbons, typically prepared by olefin polymerization, such as the VYBAR materials available from Petrolite, including VYBAR 253 (Mn=520), VYBAR 5013 (Mn=420), and the like, may also be used. In addition, the ink vehicle may be an ethoxylated alcohol, such as available from Petrolite and of the general formula

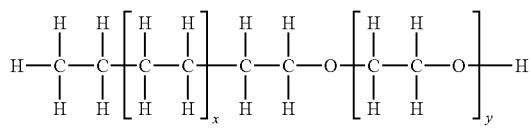

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX 420 (Mn=560), UNITHOX 450 (Mn=900), UNITHOX 480 (Mn=2,250), UNITHOX 520 (Mn=700), UNITHOX 550 (Mn=1,100), UNITHOX 720 (Mn=875), UNITHOX 750 (Mn=1,400), and the like.

As an additional example, mention may be made of fatty amides, such as monoamides, tetra-amides, mixtures thereof, and the like, for example such as described in U.S. Pat. No. 6,858,070, incorporated herein by reference. Suitable monoamides may have a melting point of at least about 50° C., for example from about 50° C. to about 150° C., although the melting point can be below this temperature. Specific examples of suitable monoamides include, for example, primary monoamides and secondary monoamides. Stearamide, such as KEMAMIDE S available from Chemtura Corporation and CRODAMIDE S available from Croda, behenamide/arachidamide, such as CRODAMIDE BR available from Croda, oleamide, such as KEMAMIDE U available from Chemtura Corporation and CRODAMIDE OR available from Croda, technical grade oleamide, such as KEMAMIDE OR available from Chemtura Corporation, CRODAMIDE O available from Croda, and UNISLIP 1753 available from Uniqema, and erucamide such as KEMAMIDE E Ultra available from Chemtura Corporation, derived from a vegetable source, and CRODAMIDE ER available from Croda, are some examples of suitable primary amides. Stearyl stearamide, such as KEMAMIDE S-180 available from Chemtura Corporation, stearyl erucamide, such as KEMAMIDE E-180 available from Chemtura Corporation and CRODAMIDE 212 available from Croda, oleyl palmitamide, such as KEMAMIDE P-181 available from Chemtura Corporation and CRODAMIDE 203 available from Croda, and erucyl stearamide, such as KEMAMIDE S-221 available from Chemtura Corporation, are some examples of suitable secondary amides. Additional suitable amide materials include, Crodamide VRX, a refined vegetable oleamide available from Croda, Crodamide SRV, a refined vegetable stearamide available from Croda and derived entirely from GM-free vegetable feedstock, Crodamide EBO, an ethylene bis-oleamide available from Croda and KEMAMIDE W20 (N,N'-ethylenebisoleamide) Preferred Crodamide products are those derived from vegetable based materials (High Erucic Rapeseed Oil) such as: Crodamide E, Crodamide ER, Crodamide VRX, Crodamide SRV, Crodamide BR, Crodamide 203, Crodamide 212, Crodamide EBO, and optionally Crodamide EBSV, an ethylene bis-stearamide.

High molecular weight linear alcohols, such as those available from Petrolite and of the general formula

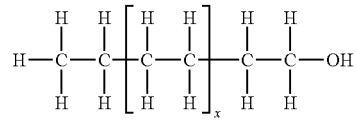

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN materials such as UNILIN 425 (Mn=460), UNILIN 550 (Mn=550), UNILIN 700 (Mn=700), and the like.

A still further example includes hydrocarbon-based waxes, such as the homopolymers of polyethylene available from Petrolite and of the general formula

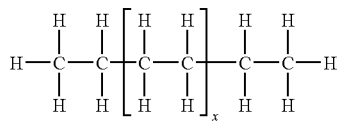

wherein x is an integer of from about 1 to about 200, such as from about 5 to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include the line of waxes, such as POLYWAX 500 (Mn=500), POLYWAX 655 (Mn=655), POLYWAX 850 (Mn=850), POLYWAX 1000 (Mn=1,000), and the like.

Another example includes modified maleic anhydride hydrocarbon adducts of polyolefins prepared by graft copolymerization, such as those available from Petrolite and of the general formulas

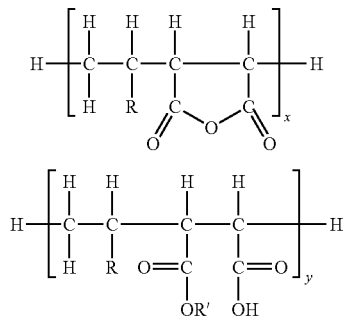

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; those available from Petrolite and of the general formula

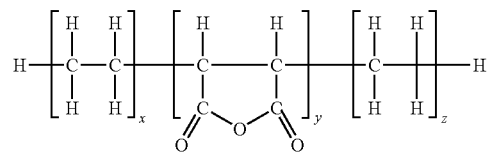

wherein x is an integer of from about 1 to about 50, such as from about 5 to about 25 or from about 9 to about 13, y is 1 or 2, and z is an integer of from about 1 to about 50, such as from about 5 to about 25 or from about 9 to about 13; and those available from Petrolite and of the general formula

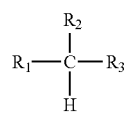

wherein $R_1$ and $R_3$ are hydrocarbon groups and $R_2$ is either of one of the general formulas

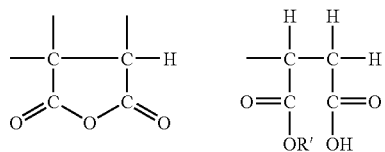

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CERAMER 67 (Mn=655, Mw/Mn=1.1), CERAMER 1608 (Mn=700, Mw/Mn=1.7), and the like.

Additional examples of suitable ink vehicles for the solid inkjet inks include polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, montan wax, candelilla wax, GILSONITE (American Gilsonite Company), and the like; mixtures of linear primary alcohols with linear long chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide), and the like. Further, linear long chain sulfones with from about 4 to about 16 carbon atoms, such as diphenyl sulfone, n-arnyl sulfone, n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecy sulfone, n-hexadecyl sulfone, chlorophenyl methyl sulfone, and the like, are suitable ink vehicle materials.

Illustrative examples of polymer resins selected for the inks and process of the present disclosure include the ink polymer resins described in co-pending U.S. patent application Ser. No. 12/131,356, which is incorporated herein by reference in its entirety.

The crystalline resins, which are available from a number of sources, can possess various melting points of, for example, from about 30° C. to about 120° C., such as from about 50° C. to about 90° C. The crystalline resin may have, for example, a number average molecular weight (Mn), as measured by gel permeation chromatography (GPC) of for example, from about 1,000 to about 50,000, and such as from about 2,000 to about 25,000. The weight average molecular weight (Mw) of the resin may be, for example, from about 2,000 to about 100,000, such as from about 3,000 to about 80,000, as determined by GPC using polystyrene standards. The molecular weight distribution (Mw/Mn) of the crystalline resin is, for example, from about 2 to about 6, and more such as from about 2 to about 4.

In addition, the ink vehicles described in U.S. Pat. Nos. 7,501,015 and 6,906,118, which are incorporated herein by reference in its entirety, may also be used. Also suitable as ink ingredients are liquid crystalline materials as disclosed in, for example, U.S. Pat. No. 5,122,187, the disclosure of which is totally incorporated herein by reference.

The ink vehicle may comprise one or more of the aforementioned suitable materials.

The ink vehicle may comprise from about 20% to about 99.5% by weight of the ink, for example from about 50% to about 95% or from about 70% to about 80% by weight of the ink.

Many ink vehicles of solid inks have an electrical conductivity of essentially zero. Thus, conductivity enhancing agents may be added to the ink in order to provide consistent conductivity to the ink.

Prior components of an solid ink that may have contributed to the electrical conductivity if the inks were colorants such as pigments and dyes, and dodecyl benzene sulfonic acid, as disclosed in U.S. Pat. No. 6,015,847, and incorporated herein by reference.

The solid ink disclosed herein may contain as an ingredient one organic salt, or a mixture of one or more suitable organic salts, for example from about 1 to about 10 organic salts, such as from about 1 to about 4 or from about 1 to about 2 organic salts. Each organic salt is present in the ink in any effective amount, for example from about 0.001 weight percent to about 8 weight percent, such as from about 0.1 weight percent to about 5 weight percent or from about 0.25 weight percent to about 5 weight percent of the ink.

The conductivity of the solid ink having the conductivity enhancing agent therein may be from about 0.01 µS/cm to about 5 µS/cm, such as from about 0.05 µS/cm to about 4 µS/cm or from about 0.09 µS/cm to about 2.5 µS/cm. Conductivity may be measured by any known method, and herein is measured under melt conditions at about 120° C. by placing titanium electrodes in the molten ink and reading the resistivity output on a Rosemount Model 1054B LC Conductivity Meter at a frequency of 60 Hz. In general, the conductivity of a material can be measured in terms of the reciprocal of resistivity, which is a material specific and temperature dependent measurement for electrical resistance.

The ink compositions of the present disclosure can also optionally contain other materials, which may depend upon the type of printer in which the ink is used. For example, the vehicle composition is typically designed for use in either a direct printing mode or an indirect or offset printing transfer system.

The ink compositions of the present disclosure can be prepared by any desired or suitable method. For example, in the case of solid or phase change inks, the ink ingredients can be mixed together, followed by heating, typically to a temperature of from about 60° to about 140° C., and stirring until a homogeneous ink composition is obtained.

The ink compositions generally also contain a colorant. Any desired or effective colorant can be employed in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include, but are not limited to, Usharect Blue 86 (Direct Blue 86), available from Ushanti Color; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNU (Hodogaya Chemical); Cantasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51 [C.I. Solvent Black, C.I. 12195] (BASF), Sudan Blue 670 [C.I. 61554] (BASF), Sudan Yellow 146 [C.I. 12700] (BASF), and Sudan Red 462 [C.I. 260501] (BASF) are preferred.

Pigments are also suitable colorants for the inks. Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); Sunfast® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASE); Bon Red C (Dominion Color Company); ORACET Pink RF (Ciba); PALIOGEN Red 3871 K (BASE); Sunfast® Blue 15:3 (Sun Chemical 249-1284); PALIOGEN Red 3340 (BASF); Sunfast® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); Spectra Pace® Orange 16 (Sun Chemical 276-3016); HELIOGEN Blue K6902, K6910 (BASF); Sunfast® Magenta 122 (Sun Chemical 228-0013); HELIOGEN Blue D6840, D7080 (BASF); Sudan Blue OS (BASF);

NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330™. (Cabot), Carbon Black 5250, Carbon Black 5750 (Columbia Chemical), mixtures thereof and the like.

The colorant is generally included in the ink in an amount of from, for example, about 0.1 to about 15% by weight of the ink, such as about 0.5 to about 6% by weight of the ink.

In embodiments, the solid or phase change ink may be a curable ink, where composition generally comprises a curable monomer. In embodiments, curing of the monomer is radically or cationically initiated. Suitable curable monomers and initiators are described in U.S. Pat. No. 7,501,015, which is incorporated herein by reference in its entirety.

In embodiments, the composition may further comprise a low viscosity additive to reduce the jetting viscosity. Examples of this additive include, but are not limited to, VEctomers® 4230, 3080 and 5015 (available from Morflex Inc., Greensboro, N.C.), which have the following chemical structures:

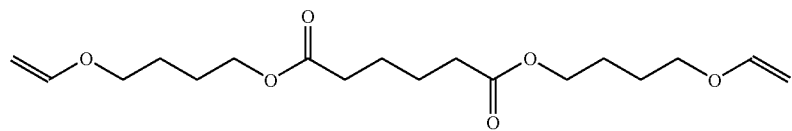

VEctomer 4230

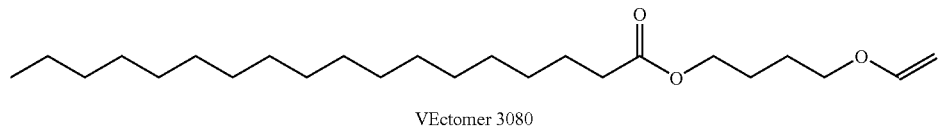

VEctomer 3080

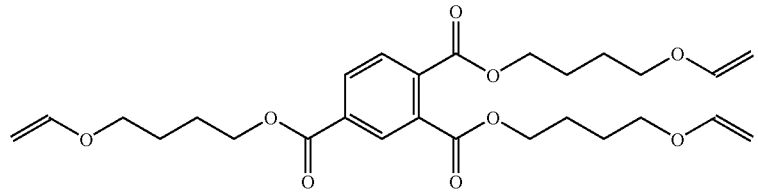

VEctomer 5015

Another suitable low viscosity additive is bis[4-(vinyloxy) butyl]dodecanedioate:

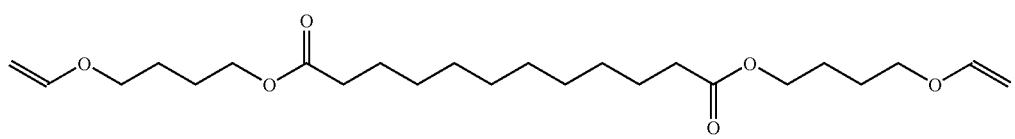 [SMILES: C=COCCCCOC(=O)CCCCCCCCCCC(=O)OCCCCOC=C]

Additional optional additives include, but are not limited to, surfactants, light stabilizers, UV absorbers, which absorb incident UV radiation and convert it to heat energy that is ultimately dissipated, antioxidants, optical brighteners, which can improve the appearance of the image and mask yellowing, thixotropic agents, dewetting agents, slip agents, foaming agents, antifoaming agents, flow agents, waxes, oils, plasticizers, binders, electrical conductive agents, fungicides, bactericides, organic and/or inorganic filler particles, leveling agents, e.g., agents that create or reduce different gloss levels, opacifiers, antistatic agents, dispersants, and the like. The composition may also include an inhibitor, such as a hydroquinone, to stabilize the composition by prohibiting or, at least, delaying, polymerization of the oligomer and monomer components during storage, thus increasing the shelf life of the composition. However, additives may negatively affect cure rate, and thus care must be taken when formulating a composition using optional additives.

The ink compositions can also optionally contain an antioxidant. The optional antioxidants of the ink compositions help to protect the images from oxidation and also help to protect the ink components from oxidation during the heating portion of the ink preparation process. Specific examples of suitable antioxidants include NAUGUARD® series of antioxidants, such as NAUGUARD® 445, NAUGUARD® 524, NAUGUARD® 76, and NAUGUARD® 512 (commercially available from Uniroyal Chemical Company, Oxford, Conn.), the IRGANOX® series of antioxidants such as IRGANOX® 1010 (commercially available from Ciba Geigy), and the like. When present, the optional antioxidant can be present in the ink in any desired or effective amount, such as in an amount of from at least about 0.01 to about 20 percent by weight of the ink, such as about 0.1 to about 5 percent by weight of the ink, or from about 1 to about 3 percent by weight of the ink.

The ink compositions can also optionally contain a viscosity modifier. Examples of suitable viscosity modifiers include aliphatic ketones, such as stearone, and the like. When present, the optional viscosity modifier can be present in the ink in any desired or effective amount, such as about 0.1 to about 99 percent by weight of the ink, such as about 1 to about 30 percent by weight of the ink, or about 10 to about 15 percent by weight of the ink.

The ink compositions can also optionally contain clarifiers, such as UNION CAMP® X37-523-235 (commercially available from Union Camp); tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like; adhesives, such as VERSAMID® 757, 759, or 744 (commercially available from Henkel), plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like; and the like. Such additives can be included in conventional amounts for their usual purposes.

The ink compositions can also optionally contain dispersing agents or surfactants may be present in the inks, typically in amounts of from about 0.01 to about 20 percent by weight. Plasticizers that may be used include pentaerythritol tetrabenzoate, commercially available as BENZOFLEX S552 (Velsicol Chemical Corporation), trimethyl titrate, commercially available as CITROFLEX 1 (Monflex Chemical Company), N,N-dimethyl oleamide, commercially available as HALCOMID M-18-OL (C. P. Hall Company), a benzyl phthalate, commercially available as SANTICIZER 278 (Ferro Corporation), and the like, may be added to the ink vehicle, and may constitute from about 1 to 40 percent of the ink vehicle component of the ink. Plasticizers can either function as the ink vehicle or can act as an agent to provide compatibility between the ink components.

The ink compositions can also optionally contain antioxidants in the ink to protect the images from oxidation and also may protect the ink components from oxidation while existing as a heated melt in the ink reservoir, Examples of suitable antioxidants include (1) N,N'-hexamethylene bis(3,5-di-tert-butyl-4-hydroxy hydrocinnamamide) (IRGANOX 1098, available from Ciba-Geigy Corporation), (2) 2,2-bis(4-(2-(3, 5-di-tert-butyl-4-hydroxyhydrocinnamoyloxy))ethoxyphenyl)propane (TOPANOL-205, available from ICI America Corporation), (3) tris(4-tert-butyl-3-hydroxy-2,6-dimethyl benzyl)isoCyanurate (CYANOX 1790, 41,322-4, LTDP, Aldrich D12,840-6), (4) 2,2'-ethylidene bis(4,6-di-tert-butylphenyl)fluoro phosphonite (ETHANOX-398, available from Ethyl Corporation), (5) tetrakis(2,4-di-tert-butylphenyl)-4,4'-biphenyl diphosphonite (ALDRICH 46,852-5; hardness value 90), (6) pentaerythritol tetrastearate (TCI America #PO739), (7) tributylammonium hypophosphite (Aldrich 42,009-3), (8) 2,6-di-tert-butyl-4-methoxyphenol (Aldrich 25,106-2), (9) 2,4-di-tert-butyl-6-(4-methoxybenzyl) phenol (Aldrich 23,008-1), (10) 4-bromo-2,6-dimethylphenol (Aldrich 34,951-8), (11) 4-bromo-3,5-didimethylphenol (Aldrich B6,420-2), (12) 4-bromo-2-nitrophenol (Aldrich 30,987-7), (13) 4-(diethyl aminomethyl)-2,5-dimethylphenol (Aldrich 14,668-4), (14) 3-dimethylaminophenol (Aldrich D14,400-2), (15) 2-amino-4-tert-amylphenol (Aldrich 41,258-9), (16) 2,6-bis(hydroxymethyl)-p-cresol (Aldrich 22,752-8), (17) 2,2'-methylenediphenol (Aldrich B4,680-8), (18) 5-(diethylamino)-2-nitrosophenol (Aldrich 26,951-4), (19) 2,6-dichloro-4-fluorophenol (Aldrich 28,435-1), (20) 2,6-dibromo fluoro phenol (Aldrich 26,003-7), (21) α-trifluoro-o-creso-1 (Aldrich 21,979-7), (22) 2-bromo-4-fluorophenol (Aldrich 30,246-5), (23) 4-fluorophenol (Aldrich F1,320-7), (24) 4-chlorophenyl-2-chloro-1,1,2-tri-fluoroethyl sulfone (Aldrich 13,823-1), (25) 3,4-difluoro phenylacetic acid (Aldrich 29,043-2), (26) 3-fluorophenylacetic acid (Aldrich 24,804-5), (27) 3,5-difluoro phenylacetic acid (Aldrich 29,044-0), (28) 2-fluorophenylacetic acid (Aldrich 20,894-9), (29) 2,5-bis (trifluoromethyl) benzoic acid (Aldrich 32,527-9), (30) ethyl-2-(4-(4-(trifluoromethyl)phenoxy)phenoxy)propionate (Aldrich 25,074-0), (31) tetrakis (2,4-di-tert-butyl phenyl)-4,4'-biphenyl diphosphonite (Aldrich 46,852-5), (32) 4-tert-amyl phenol (Aldrich 15,384-2), (33) 3-(2H-benzotriazol-2-yl)-4-hydroxy phenethylalcohol (Aldrich 43,071-4), NAUGARD 76, NAUGARD 445, NAUGARD 512, AND NAUGARD 524 (manufactured by Uniroyal Chemical Company), and the like, as well as mixtures thereof. The antioxidant, when present, may be present in the ink in any desired or effective amount, such as from about 0.15 percent to about 10 percent by weight of the ink or from about 0.2 percent to about 3 percent by weight of the ink.

The ink can also optionally contain a UV absorber. Illustrative examples of optional UV absorbers selected for the inks and process of the present disclosure include the UV absorbers described in co-pending U.S. patent application Ser. No. 12/131,356, which is incorporated herein by reference in its entirety.

The inks can be employed in apparatus for direct printing inkjet processes, wherein when droplets of the melted ink are ejected in an imagewise pattern onto a recording substrate, the recording substrate is a final recording substrate. Alternatively, the inks can be employed in indirect (offset) printing inkjet applications, wherein when droplets of the melted ink are ejected in an imagewise pattern onto a recording substrate, the recording substrate is an intermediate transfer member and the ink in the imagewise pattern is subsequently transferred from the intermediate transfer member to a final recording substrate.

The substrate may be any suitable material such as paper, boxboard, cardboard, fabric, a transparency, plastic, glass, wood etc., although the ink is desirably used in forming images on paper.

The present disclosure is also directed to a printer containing the inks described herein. Specifically, the present disclosure relates to a printer cartridge containing the inks described herein, as well as to a printer containing the printer cartridge.

The present disclosure also relates to a method for applying the ink to form an image. In embodiments, the method comprises providing the ink at or above the first temperature; applying the ink to a substrate to form an image, the substrate being at or below the second temperature. In a preferred embodiment, the composition is applied over the image by inkjet printing.

Examples are set forth below and are illustrative of different compositions and conditions that can be utilized in practicing the disclosure. All proportions are by weight unless otherwise indicated. It will be apparent, however, that the disclosure can be practiced with many types of compositions and can have many different uses in accordance with the disclosure above and as pointed out hereinafter.

EXAMPLES

Licowax® SW is an acid wax, available from Clariant, with a melting temperature as measured by differential scanning calorimetry (DSC) of approximately 80° C. and an acid value of 115-135 mgKOH/g. The compositions of the inks prepared are presented in Table 2. All inks were prepared by pre-melting the ink components followed by mixing the melt in a heated vessel for 4 hours while adding gradually the dye. All inks were subsequently filtered through a 0.45 micron Parker filter and evaluated. A commercially available solid inkjet ink was measured as a control.

TABLE 2

Composition of inks for improved scratch and fold.

| Component | Control | Ink I | Ink II | Ink III | Ink IV | Ink V | Ink VI | Ink VII |
|---|---|---|---|---|---|---|---|---|
| A |  | 16.00 | 16.00 |  |  |  |  |  |
| B | 12.38 | 16.00 | 16.00 | 15.00 | 15.00 | 15.00 | 15.00 | 15.00 |
| C | 15.60 |  |  | 15.00 | 15.00 | 15.00 | 15.00 | 15.00 |
| D | 14.82 |  |  | 15.00 | 15.00 | 15.00 | 15.00 | 15.00 |
| E |  | 15.00 | 15.00 |  |  |  |  |  |
| Licowax ® SW |  | 24.45 | 24.45 | 24.45 | 20 | 15.00 | 10.00 | 5.00 |
| F | 51.37 | 25.00 | 25.00 | 25.00 | 29.45 | 34.45 | 39.45 | 44.45 |
| G | 2.08 |  |  |  |  |  |  |  |
| H | 3.55 | 3.35 | 3.35 | 3.35 | 3.35 | 3.35 | 3.35 | 3.35 |
| I | 0.20 | 0.20 | 0.20 | 0.20 | 0.20 | 0.20 | 0.20 | 0.20 |
| TOTAL COMPOSITION (wt %) | 100.00 | 100.00 | 100.00 | 100.00 | 100.00 | 100.00 | 100.00 | 100.00 |
| Viscosity @ 140° C. (cps) | 6.20 | 9.46 | 9.5 | 9.3 | 8.4 | 8.2 | 6.95 | 6.4 |
| Temperature for 10.6 cps (?C) | 110.00 | 135 | 135 | 132 | 126 | 122 | 120 | 115 |
| Onset of Crystallization (?C) | 88.00 | 90 | 90 | 90 | 90 | 90 | 90 | 90 |

Component A: Unicid 425 methyl amide, salts of long chain fatty carboxylic acids (C28 carboxylic acids).
Component B: Branched triamide as described in U.S. Pat. No. 6,860,930.
Component C: KE 100 Pinecrystal, product prepared by esterifying various rosins and subjecting the obtained esters to hydrogenation or purification.
Component D: S 180, stearyl stearamide.
Component E: Di-urethane resin product as described in Example 1 of U.S. Pat. No. 6,620,228.
Component F: Polyethylene wax
Component G: Urethane product as described in Example 4 of U.S. Pat. No. 6,309,453.
Component H: Blue Mustang Dye.
Component I: NAUGARD 445, 4,4'-Bis (α,α-dimethylbenzyl) diphenylamine Detailed Description of Ink Compositions.

In Ink I, half of the polyethylene wax used in the commercially available solid inkjet ink (control) was replaced with Licowax® SW. As described below, Ink I showed dramatically improved scratch and fold properties. Scratch and fold performance were quantified using a scanner-based Image Quality evaluation routine. The images were scanned and the scratched or creased area was measured. A large scratched or creased area indicates poor performance.

Ink II is a duplicate of Ink I. Ink III is also based on a commercially available solid inkjet ink. As in Ink I, half of the polyethylene wax in Ink III is replaced with Licowax® SW. Four other inks, IV, V, VI and VII, were also made by lowering the concentration of Licowax® SW while increasing the polyethylene wax content (as set forth in Table 2) without affecting the improved properties. The concentration of the Licowax® SW was reduced to 20%, 15%, 10% and 5%, respectively.

Print Evaluation

Final filtered inks were evaluated in a commercially available solid inkjet ink printer. Print process/image quality parameters were determined using a Phaser 8400 printer modified to run low energy inks. Parameters are compared to commercially available low energy solid inkjet inks printed on the same printer, with the same operating conditions, Operating conditions, such as dropmass, drum temperature, preheat temperature, and transfix velocity print resolution were adjusted as necessary. All measurements were made using 75 gsm/20 lb paper (Xerox).

The evaluation methods and quantification metrics are described in Table 3 and they were performed by both scanner based IQ quantification metrics developed in Xerox, and visual quantifications.

TABLE 3

Test targets and Quantification metrics for the aforementioned inks.

| Test Target | Quantification Metric |
| --- | --- |
| envelope | post office mailing |
| insert | post office mailing |
|  | Fuser fixture test |
| D-Rub/FxBelt | Dynamic Rub w/ FX Oring |
| scratch/fold/tape | IQAF scratch/Fold |
| scratch/fold/tape | IQAF scratch/Fold |
| double ink layer |  |
| squish target | IQAF |
| insert | Fuser fixture test |

Print Evaluation

All the above inks were filtered using existing ink development methods. Final filtered inks were poured into Phaser 8400 cyan ink tubs and evaluated. Print process/image quality parameters were determined using a Phaser 8400 printer modified to run Lance low energy inks. Parameters are compared to commercially available solid inkjet ink printed on the same printer, with the same operating conditions. Operating conditions, such as Printhead Firing frequency, preheat temperature, transfix velocity, and print resolution, were adjusted as necessary. All measurements are made using 75 gsm/20 lb paper (Xerox).

Ink I was compared against a commercially available solid inkjet ink (control). Significant improvement of scratch and fold properties of Ink I compared to the commercially available solid inkjet ink are observed.

Additionally, an example of Oce ColorWave 600 Toner-Pearls ink was evaluated. Although the ink coverage of the Oce print is unknown, it serves as a crude reference. The prints were folded manually. Although a machine fold is more severe than a manual fold, the tests where the prints were folded manually are for purposes of comparison to the Oce prints.

The prints were also scratched using an apparatus made of three sharp metal fingers each under a certain amount of weight, and a fixed platen. In this test, the print is secured over the platen. Then fingers are lowered to touch the print. The fingers are then moved via a motor with constant speed. The different fingers create the three levels of scratch: Heavy, Medium, and Light.

A significant improvement was observed in Ink I over the commercially available solid inkjet ink. In Ink I the medium scratch was hardly present whereas in the commercially available solid inkjet ink the medium scratch is a well defined scratch.

Conclusions of the Ink Evaluations.

Ink I also had the best scratch performance comparable to the Oce sample. Inks 22 and 24 were similar to Ink I and display improved scratch and machine fold properties.

It will be appreciated that various of the above-disclosed and other features and functions, or alternatives thereof may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A composition comprising:
    at least one polar wax having at least one acidic group, wherein the polar wax has a melting temperature of from about 60° C. to about 100° C., and wherein the at least one polar wax includes carnauba wax, and the composition further comprises:
    stearyl stearamide; ethylene bis-oleamide; and
    a Fischer-Tropsch wax, wherein the composition is a solid ink composition;
    wherein an onset of crystallization temperature of the ink composition is 90° C.

2. The composition of claim 1, wherein the composition further comprises at least one antioxidant.

3. The composition of claim 1, wherein the composition further comprises at least one solvent dye.

4. An ink composition comprising:
    a least one polar wax having at least one acidic group, wherein the polar wax has a melting temperature of from about 60° C. to about 100° C., and wherein the least one polar wax includes carnauba wax, and the ink composition further comprises:
    stearyl stearamide;
    ethylene bis-oleamide;
    a Fischer-Tropsch wax;
    at least one antioxidant; and
    at least one solvent dye colorant,
    wherein the ink composition is a phase change ink composition that is solid at room temperature, and an onset of crystallization temperature of the ink composition is 90° C.

5. The ink composition of claim 4, wherein the ink composition has a melting point of from about 50° C. to about 160° C.

6. The ink composition of claim 5, wherein the ink composition has a melting point of from about 70° C. to about 100° C.

* * * * *